(12) United States Patent
Yoshioka

(10) Patent No.: US 7,673,794 B2
(45) Date of Patent: Mar. 9, 2010

(54) PERSONAL INFORMATION VERIFICATION PROGRAM, METHOD AND APPARATUS

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 11/639,348

(22) Filed: Dec. 15, 2006

(65) Prior Publication Data

US 2007/0145123 A1 Jun. 28, 2007

(30) Foreign Application Priority Data

Dec. 28, 2005 (JP) ............................. 2005-377808

(51) Int. Cl.
*G06F 21/00* (2006.01)
*G06K 5/00* (2006.01)
(52) U.S. Cl. ........................................ 235/380; 705/53
(58) Field of Classification Search ................. 235/383, 235/385; 705/35, 28, 53; 713/176
See application file for complete search history.

(56) References Cited

U.S. PATENT DOCUMENTS

| 6,658,403 | B1 | 12/2003 | Kuroda et al. | |
|---|---|---|---|---|
| 7,051,001 | B1 * | 5/2006 | Slater | 705/39 |
| 7,308,577 | B2 * | 12/2007 | Wakao | 713/176 |
| 2003/0023862 | A1 * | 1/2003 | Yamasaki et al. | 713/194 |
| 2007/0067227 | A1 * | 3/2007 | Ikeda et al. | 705/28 |

FOREIGN PATENT DOCUMENTS

| EP | 0982674 | 1/2000 |
|---|---|---|
| EP | 1162580 | 12/2001 |
| EP | 1388797 | 11/2004 |
| JP | 2000-285024 | 10/2000 |
| JP | 2001-117820 | 4/2001 |
| WO | WO 98/40809 | 9/1998 |

OTHER PUBLICATIONS

Extended European Search Report (in English) Mailed Mar. 27, 2007 issued with respect to the corresponding European Patent Application No. 06126159.0-1238 (9 pages).

* cited by examiner

*Primary Examiner*—Thien M. Le
*Assistant Examiner*—Sonji Johnson

(57) ABSTRACT

A personal information verification system using an intermediary server and a settlement institution server, where personal information with an electronic signature, showing a desired purchase and a first version of item hash information are received from a person terminal. Then, the intermediary server generates a second version of item hash information by hiding the purchase item and adding an electronic signature, and transmits the second version of the item hash information to the settlement institution server. The settlement institution server sends a payment bill to a seller, generates the third version of the item hash information, and transmits the third version of the item hash information together with the amended personal information. The intermediary server generates a fourth version of the item hash information and transmits the personal information and the first to fourth versions of the item hash information to the seller terminal.

13 Claims, 22 Drawing Sheets

ORDER SHEET OF PURCHASE-
DESIRING PERSON

NAME: HANAKO SUZUKI
ADDRESS: KAWASAKI-CITY
PRODUCT NAME: RED SHOES
AMOUNT OF MONEY: ¥5000
CARD NO.: 12345

FIG. 9A SIGNATURE ON ORDER SHEET
(ENCRYPTED WITH SECRET KEY)

ITEM HASH INFORMATION
OF ORDER SHEET OF
PURCHASE-DESIRING PERSON

NAME: abc123
ADDRESS: def456
PRODUCT NAME: ghi789
AMOUNT OF MONEY: jkl012
CARD NO.: mno345

FIG. 9B SIGNATURE ON ORDER SHEET
(ENCRYPTED WITH SECRET KEY)

INFORMATION TRANSMITTED TO
SETTLEMENT INSTITUTION

PERSONAL INFORMATION OF
SECOND VERSION

ORDER ID: 000001
NAME: HANAKO SUZUKI
ADDRESS: KAWASAKI-CITY
PRODUCT NAME: *****
AMOUNT OF MONEY: ¥5000
CARD NO.: 12345

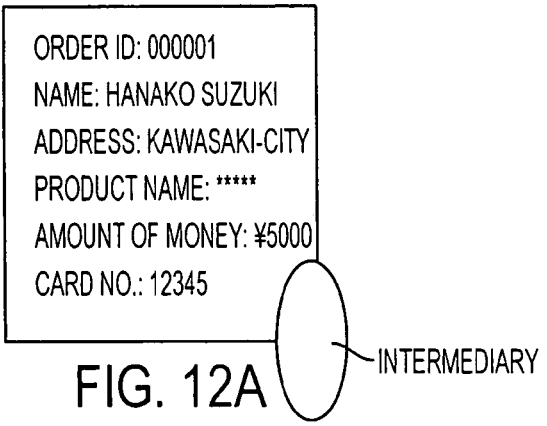 — INTERMEDIARY

FIG. 12A

ITEM HASH INFORMATION
OF SECOND VERSION

ORDER ID: pqr678
NAME: abc123
ADDRESS: def456
PRODUCT NAME: stu901
AMOUNT OF MONEY: jkl012
CARD NO.: mno345

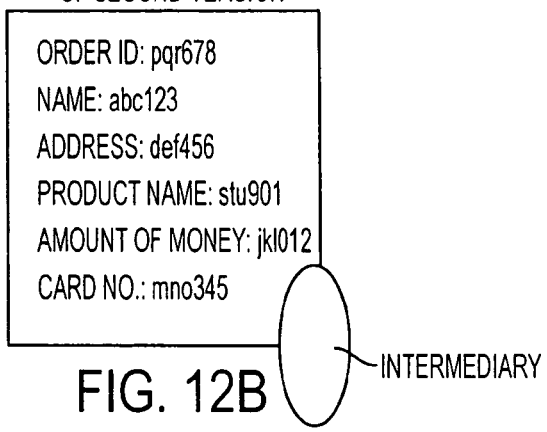 — INTERMEDIARY

FIG. 12B

ITEM HASH INFORMATION
OF FIRST VERSION

NAME: abc123
ADDRESS: def456
PRODUCT NAME: ghi789
AMOUNT OF MONEY: jkl012
CARD NO.: mno345

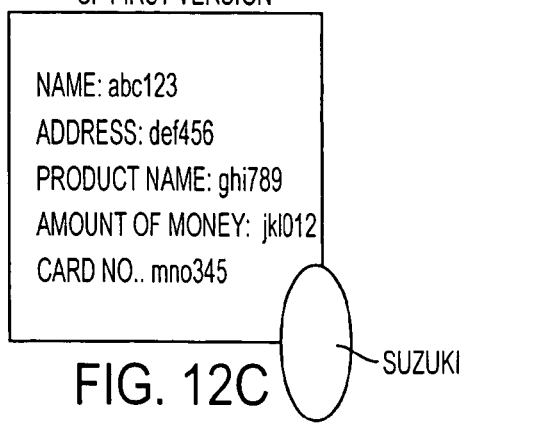 — SUZUKI

FIG. 12C

ORDER SHEET INFORMATION
OF THIRD VERSION

PERSONAL INFORMATION
OF THIRD VERSION

ORDER ID: 000001

SETTLEMENT ID: ABC05

NAME: HANAKO SUZUKI

ADDRESS: KAWASAKI-CITY

PRODUCT NAME: *****

AMOUNT OF MONEY: ¥5000

CARD NO.: 12345

— SETTLEMENT INSTITUTION

FIG. 14A

ITEM HASH INFORMATION
OF THIRD VERSION

ORDER ID: pqr678

SETTLEMENT ID: vwx234

ADDRESS: def456

PRODUCT NAME: stu901

AMOUNT OF MONEY: jkl012

CARD NO.: mno345

— SETTLEMENT INSTITUTION

FIG. 14B

PAYMENT BILL INFORMATION
TO SELLER

SETTLEMENT ID: ABC05
AMOUNT OF MONEY: ¥5000

— SETTLEMENT INSTITUTION

FOURTH VERSION OF
PERSONAL INFORMATION

ORDER ID: 000001

SETTLEMENT ID: ABC05

NAME: HANAKO SUZUKI

ADDRESS: KAWASAKI-CITY

PRODUCT NAME: RED SHOES

AMOUNT OF MONEY: ¥5000

CARD NO.: *****

—INTERMEDIARY

FIG. 17A

FOURTH VERSION OF
ITEM HASH INFORMATION

ORDER ID: pqr678

SETTLEMENT ID: vwx234

NAME: abc123

ADDRESS: def456

PRODUCT NAME: ghi789

AMOUNT OF MONEY: jkl012

CARD NO.: wed678

—INTERMEDIARY

FIG. 17B

INFORMATION TRANSMITTED TO SELLER TERMINAL

| ITEM | CREATION |
|---|---|
| ORDER ID | INTERMEDIARY |
| SETTLEMENT ID | SETTLEMENT INSTITUTION |
| NAME | PURCHASE-DESIRING PERSON |
| ADDRESS | PURCHASE-DESIRING PERSON |
| PRODUCT NAME | PURCHASE-DESIRING PERSON |
| AMOUNT OF MONEY | PURCHASE-DESIRING PERSON |
| CARD NO. | INTERMEDIARY |

FIG. 19

| NO. OF VERSIONS | ELECTRONIC SIGNATURE |
|---|---|
| FIRST VERSION | SUZUKI |
| SECOND VERSION | INTERMEDIARY |
| THIRD VERSION | SETTLEMENT INSTITUTION |
| FOURTH VERSION | INTERMEDIARY |

FIG. 21

| ITEM | NO. OF VERSIONS |
|---|---|
| ORDER ID | SECOND VERSION |
| SETTLEMENT ID | THIRD VERSION |
| NAME | FIRST VERSION |
| ADDRESS | FIRST VERSION |
| PRODUCT NAME | FIRST VERSION |
| AMOUNT OF MONEY | FIRST VERSION |
| CARD NO. | FOURTH VERSION |

FIG. 22

| ITEM | ELECTRONIC SIGNATURE |
| --- | --- |
| ORDER ID | INTERMEDIARY |
| SETTLEMENT ID | SETTLEMENT INSTITUTION |
| NAME | PURCHASE-DESIRING PERSON |
| ADDRESS | PURCHASE-DESIRING PERSON |
| PRODUCT NAME | PURCHASE-DESIRING PERSON |
| AMOUNT OF MONEY | PURCHASE-DESIRING PERSON |
| CARD NO. | INTERMEDIARY |

FIG. 23

PERSONAL INFORMATION VERIFICATION PROGRAM, METHOD AND APPARATUS

CROSS-REFERENCE TO RELATED APPLICATIONS

This application is related to and claims the benefit of priority to Japanese Patent Application No. 2005-377808, filed Dec. 28, 2005, in Japan, the contents of which are incorporated by reference herein.

FIELD OF THE INVENTION

The present invention relates to an electronic document and personal information verification program, method and apparatus particularly for electronic commercial transactions, which can guarantee originality of a document and can verify the identity of a person who corrected an electronic document, when the electronic document is distributed through a plurality of entities.

DESCRIPTION OF THE RELATED ART

An electronic settlement system has been employed widely, in which a seller establishes a Web site on the Web and a user executes settlement by selecting a desired product to purchase, and then inputting a credit card number and personal information.

The web is generally called a push type Web and a user cannot read contents thereof while the user is not accessing the object address. Accordingly, even when an actual seller establishes a Web site, a person who desires to purchase a product cannot purchase the product in virtual shops if the person does not know the address of such a Web site.

Therefore, in recent years, an intermediary (e.g., a person or entity in charge of an intermediary server) establishes a Web site and a seller makes a contract with this intermediary to open the Web page, called a virtual shop, of each seller on the Web site of the intermediary.

Thereby, a purchase-desiring person is rendered capable of accessing a virtual shop of the desired intermediary from a Web site by accessing the Web site of the intermediary from his or her own terminal (hereinafter, referred to as a terminal of the purchase-desiring person). Accordingly, the purchase-desiring person can access various virtual shops. Moreover, a seller can also enjoy the merit that the purchase-desiring persons are accessing the virtual shops even when the address of the Web site of the seller is not distributed.

For the settlement in such virtual shops, a credit card is generally used. In the case of settlement using a credit card, access to a server of a credit card company is also required. However, in order to simplify the purchasing procedures, a purchase-desiring person is urged to input personal information required for settlement and to add an electronic signature to prove the input by the purchase-desiring person in the particular Web page of the intermediary. The intermediary who has received the personal information sends the personal information with the electronic signature to respective traders in regard to settlement (e.g., credit card company, seller or the like).

Moreover, after the settlement, a credit card company generates a detail payment bill with addition of this credit card number and amount of money and then sends this detail payment bill to a seller.

Here, the seller is requested to collate the personal information from the intermediary with the amount of money transferred from the credit card company and to check that the money is deposited correctly.

Conventionally, the collation can be made by collating the credit card number and amount of money entered in the detail payment bill transmitted from the credit card company with the credit card number and amount of money included in the personal information acquired via the intermediary at the time of settlement.

However, only the seller and the intermediary are in contact with each other. The intermediary cannot take part in the management of the transmitted personal information by the seller. Therefore, it is possible that the personal information can be leaked by malicious sellers.

Particularly, when the personal information includes high-risk information such as a credit card number, the risk of an information leak becomes a serious problem.

On the other hand, it is also conventional to delete the credit card number from the personal information in the server of the intermediary and then add an individual number instead of the card number. But, revision of information by the intermediary is difficult because an electronic signature has been added to the personal information as a whole and this electronic signature has proved that the personal information has been inputted by the purchase-desiring person himself or herself.

As a measure to overcome this difficulty, the purchase-desiring person is requested to add the desired number at the time of inputting the personal information. However, the purchase-desiring person is not aware of other numbers already added by the other purchase-desiring people. Therefore, the purchase-desiring person may add the same number as that added by another purchase-desiring person. Accordingly, such a desired number cannot be used by the purchase-desiring person as the identification number.

As a measure to overcome such a problem, the purchase-desiring person checks the desired number inputted to the server of the intermediary. However, when purchase-desiring persons have inputted the same number, the manipulation for requesting the purchase-desiring persons to input the number again may be increased and thereby procedures of the purchase-desiring persons will be increased.

In view of the background explained above, it is an object of the present invention to provide a personal information verification program, method and apparatus which can verify a person who has hidden the data and a person who has created the part other than the hidden part, if an intermediary tries to hide a part of data, and also can enable collation between the amount of money at each settlement and the amount of money deposited using a credit card, even when a seller does not use the credit card.

SUMMARY OF THE INVENTION

According to an aspect of the present invention, in order to solve the problems explained above, a computer, which can communicate with a settlement institution server installed in a settlement institution and can access a storing means for storing the information about settlement, is controlled to execute storing the received information in the storing means and transmitting the information to a settlement institution server when a first version of personal information, including the information showing a desired purchase, and identifying information identifying the settlement institution, identifying a purchase-desiring person and a first version of verification information which can prove a creator of each item of the first version of the personal information, are received. The computer is also controlled to execute storing the received information in the storing means, generating a third version of the personal information in which the identifying information of the settlement institution, identifying a purchase-desiring person, is erased, generating the third version of the verification information which can prove a creator of each item of the third version of the personal information, and transmitting, to a seller apparatus of a product seller, the third version of the personal information and the first, second and third versions of the verification information stored in the storing means, when the second version of the personal information, adding the settlement number to the personal information of the first version, and the second version of the verification information, which can verify a creator of each item of the second version of the personal information, are received from the settlement institution server after the transmitting by the settlement institution server.

BRIEF DESCRIPTION OF THE DRAWINGS

FIGS. 9(a) and 9(b) are diagrams illustrating a first version of order sheet information generated with a terminal of an order desiring person according to an embodiment of the present invention.

FIGS. 12(a), 12(b) and 12(c) are diagrams illustrating the information transmitted to a settlement institution server from the intermediary server according to an embodiment of the present invention.

FIGS. 14(a) and 14(b) are diagrams illustrating a third version of the order sheet information generated with the settlement institution server according to an embodiment of the present invention.

FIGS. 17(a) and 17(b) are diagrams illustrating a fourth version of the order sheet information generated with the intermediary server according to an embodiment of the present invention.

FIG. 19 is a diagram illustrating a correspondence table of an item where an electronic signature is previously stored in a storing means (not illustrated) of the seller terminal according to an embodiment of the present invention.

FIG. 21 is a diagram illustrating several versions of correspondence information where an electronic signature is generated with the verifying process of the seller terminal according to an embodiment of the present invention.

FIG. 22 is a diagram illustrating several versions of correspondence information of an item where the versions are generated with the verifying process of the seller terminal according to an embodiment of the present invention.

FIG. 23 is a diagram illustrating correspondence information of an item where the electronic signature is generated with the verifying process of the seller terminal according to an embodiment of the present invention.

DETAILED DESCRIPTION OF THE PREFERRED EMBODIMENTS

The preferred embodiments of a personal information verification program, method and apparatus of the present invention will be explained in detail with reference to the accompanying drawings.

First, a structure of the personal information verification system of the present invention will be explained with reference to FIG. 1.

Figure 1:
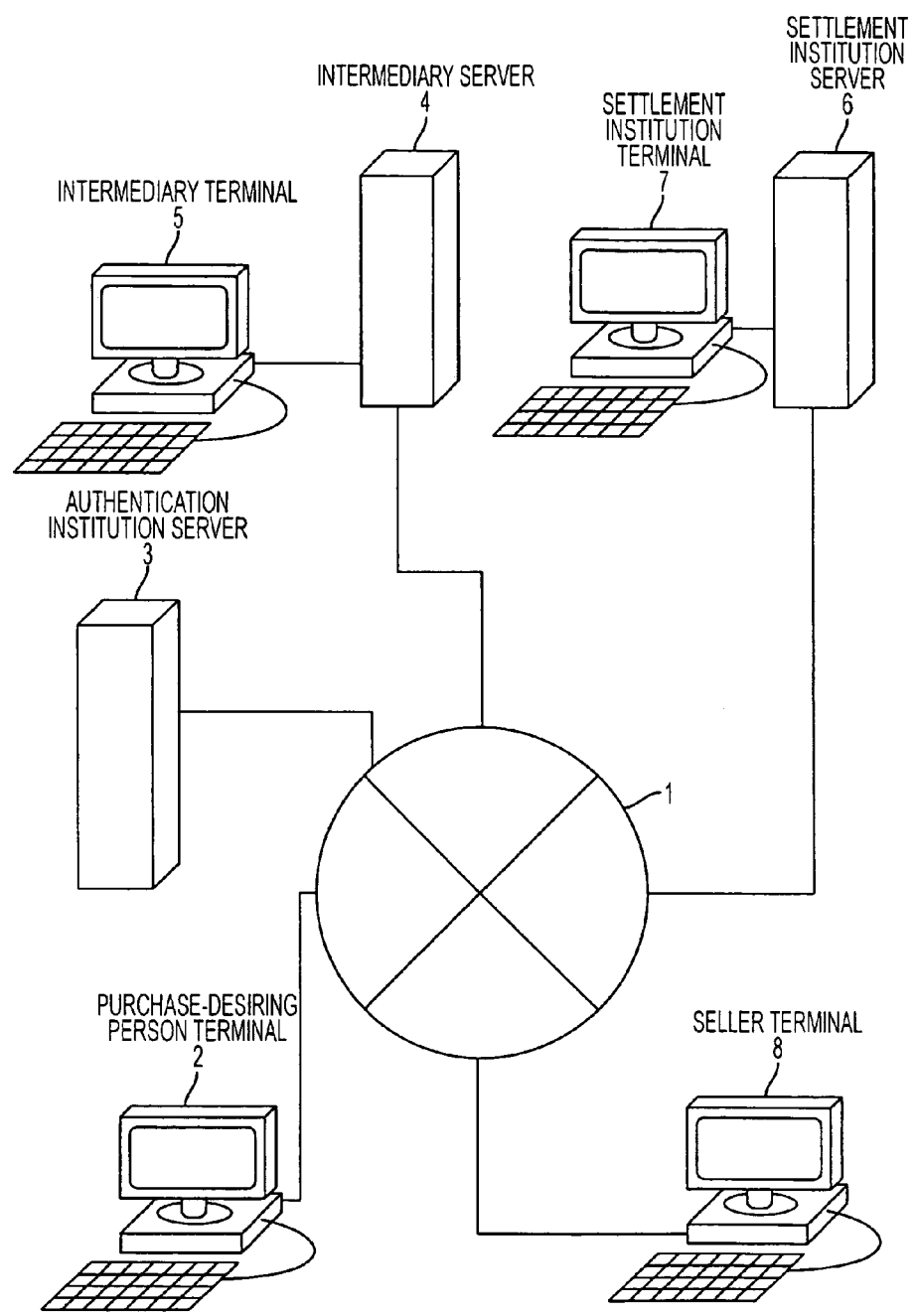
FIG. 1 is a system structure diagram of a personal information verification system according to an embodiment of the present invention.

FIG. 1 is a system structure diagram of the personal information verification system according to an embodiment of the present invention.

In FIG. 1, reference numeral 1 denotes the Internet, and reference numeral 2 denotes a terminal of a purchase-desiring person. The purchase-desiring person is capable of accessing the Web and inputting personal information by manipulating the terminal 2 of that purchase-desiring person.

Figure 2:
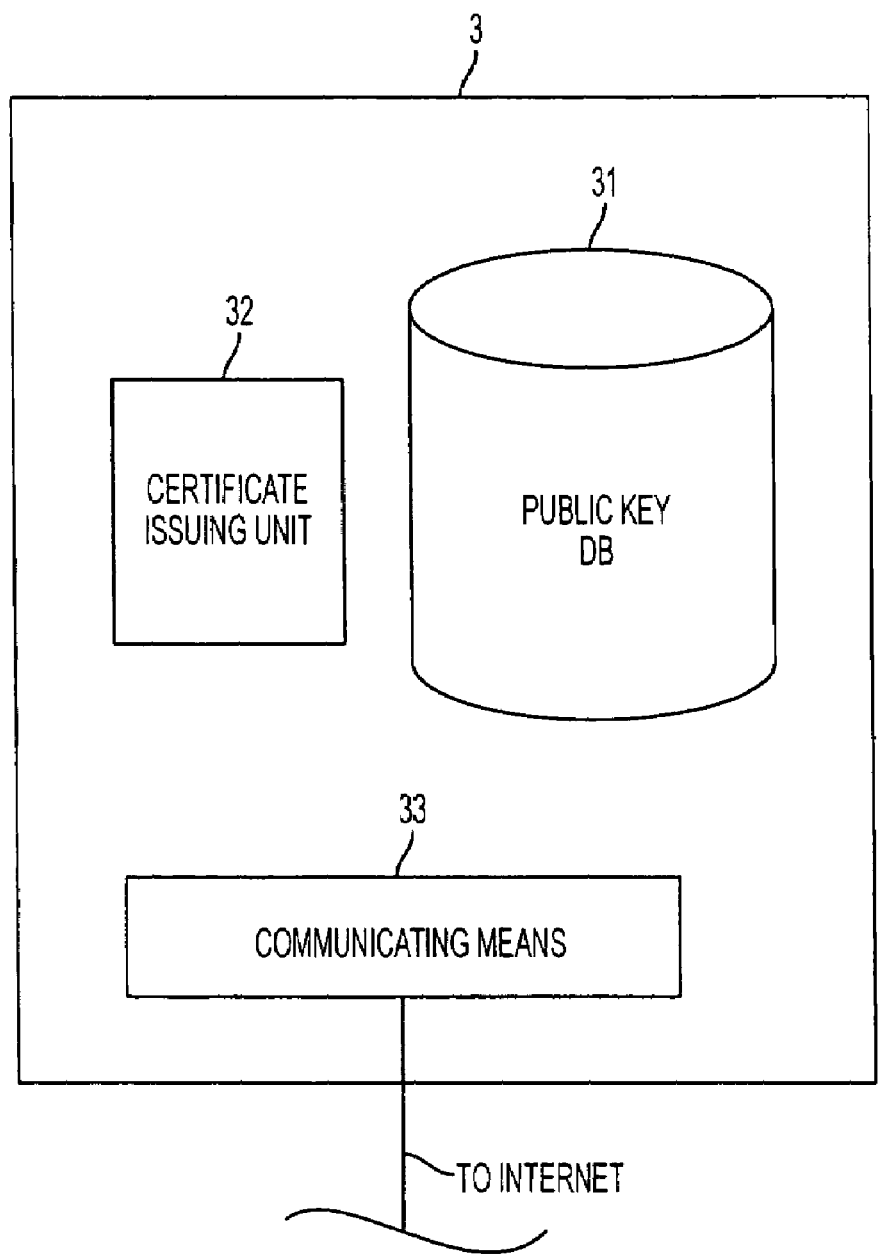
FIG. 2 is a structure diagram of a verification institution server according to an embodiment of the present invention.

The reference numeral 3 denotes a server of a verification institution for management of electronic signature information. As is known, electronic signature technology enables determining whether a transmission is made with a legitimate person in accordance with decoding, using the public key included in a certificate, by transmitting the information encrypted with the secret key of a transmitting person, and by acquiring, by a receiving person, the certificate of the transmitting person accumulated in the server 3 of the verification institution. Since this technology is demanded to secure legitimacy of the certificate, the sever 3 of the verification institution, storing the public keys of users, is generally installed in this manner. This verification institution server 3 comprises, as is illustrated in FIG. 2, a public key DB 31 storing a public key of each user, a certificate issuing unit 32 issuing a certificate responding to the request, and a communicating means 33 for communicating via the internet 1.

Figure 3:
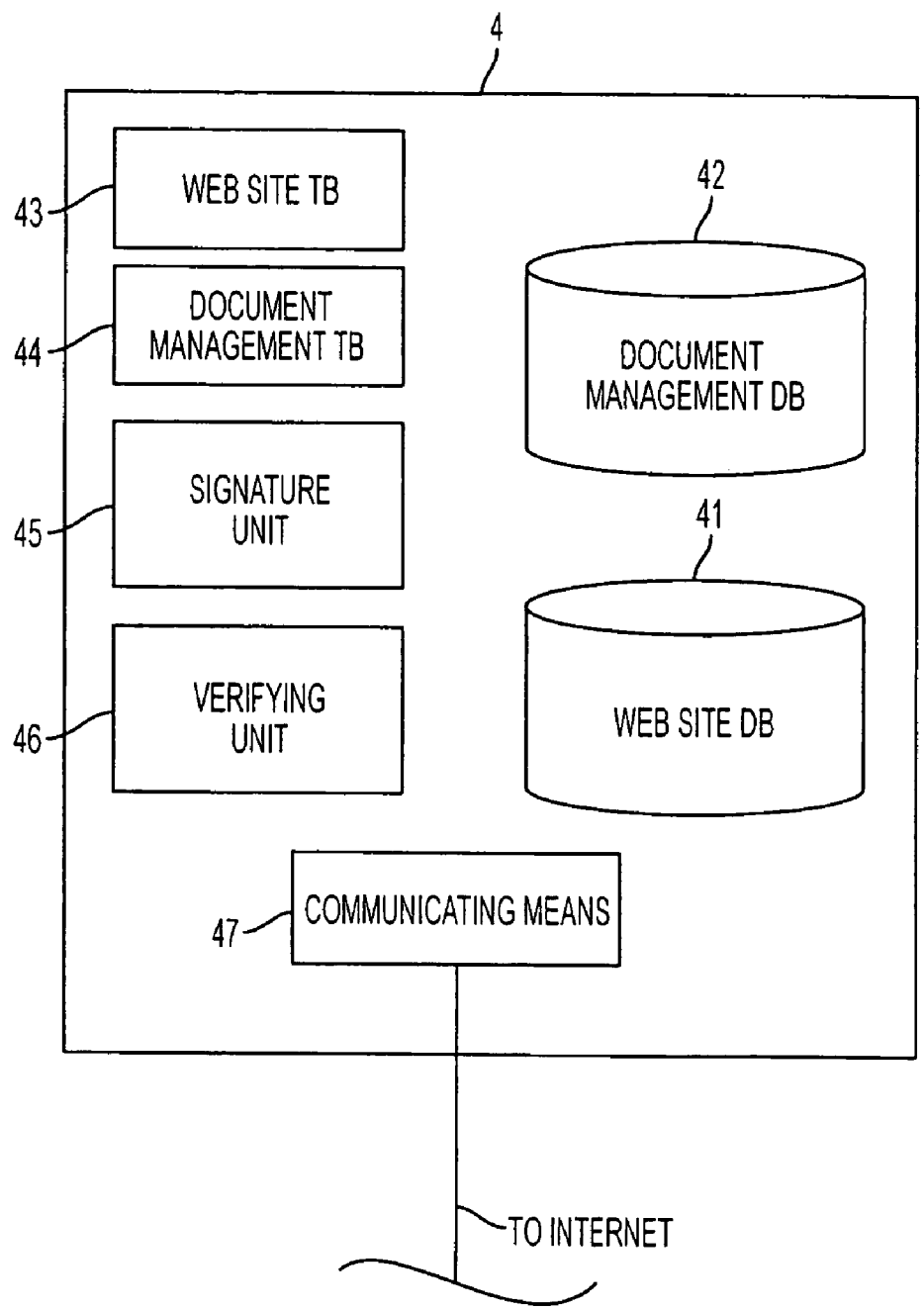
FIG. 3 is a structure diagram of an intermediary server according to an embodiment of the present invention.

The reference numeral 4 denotes an intermediary server for executing processes in the web site of an intermediary (not shown). This intermediary server 4 comprises, as illustrated in FIG. 3, a web site DB 41 storing data of each page displayed at the web site, a document management DB 42 storing personal information from a purchase-desiring person terminal and information transmitted and received between the settlement institution server 6 and a seller terminal 8 both explained later, a web site TB 43 outputting information of the web site by utilizing information of the web site DB 41, a document management TB 44 for access control to the document management DB 42, a signature unit 45 adding an electronic signature of the intermediary, and a communicating means 47 making communication via the Internet 1.

Moreover, the reference numeral 5 denotes an intermediary terminal communicating with the intermediary server 4 to allow the intermediary to manipulate the intermediary server 4.

Figure 4:
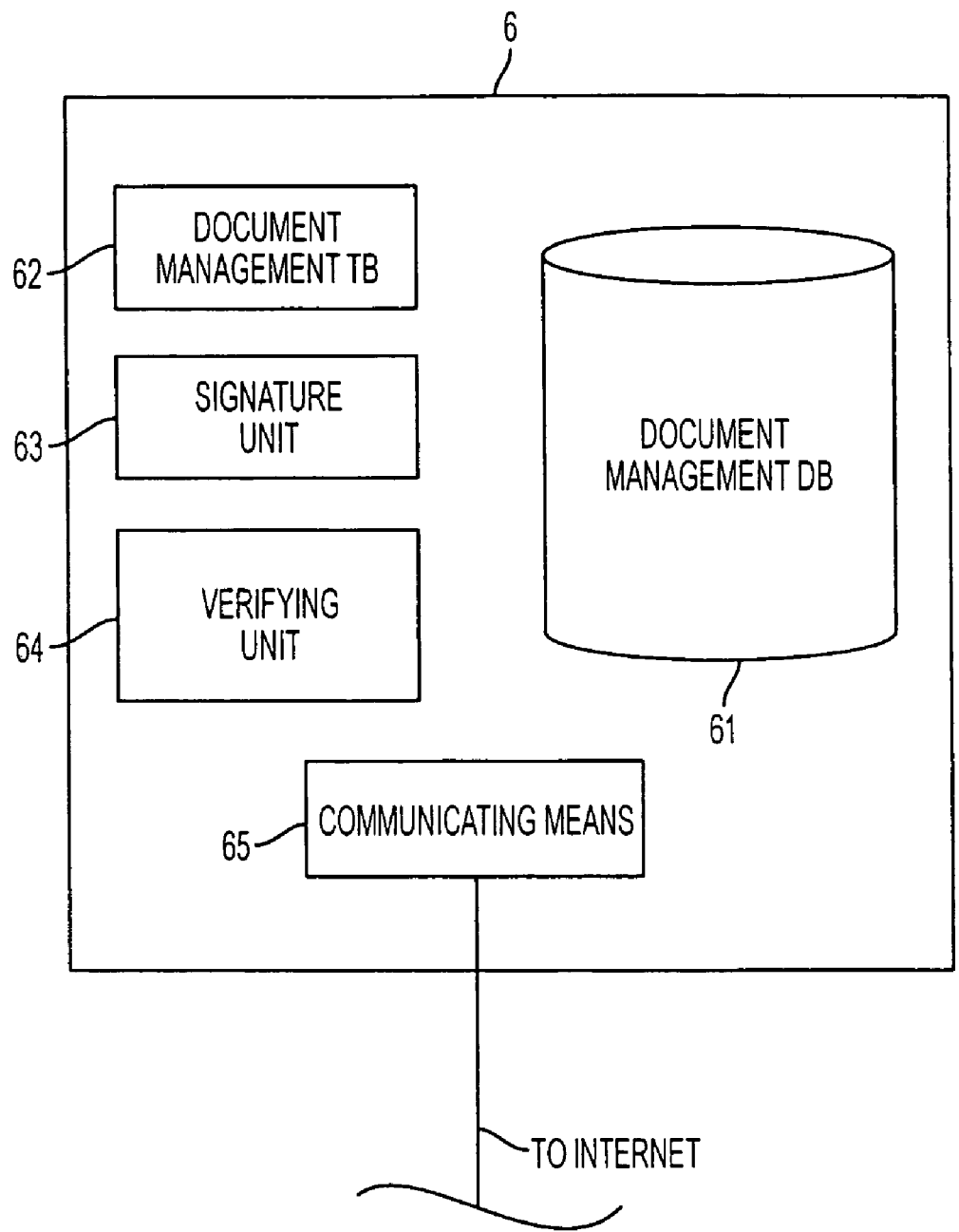
FIG. 4 is a structure diagram of a settlement institution server according to an embodiment of the present invention.

The reference numeral 6 denotes a settlement institution server installed in a credit card company, for example, as a settlement institution. This settlement institution server 6 comprises, as illustrated in FIG. 4, a document management DB 61 storing a variety of information, a document management TB 62 making access to the document management DB 61, a verifying unit 64 verifying an electronic signature added to the information transmitted, and a communicating means 65 communicating through the internet.

Moreover, the reference numeral 7 denotes a settlement institution terminal with which a person in charge of the settlement institution manipulates the settlement institution server 6.

The reference numeral 8 denotes a seller terminal of a product seller.

Processing operations of a personal information verification system structured as explained above will be explained below.

First, prior to explanation of a settlement process, which is a characteristic of the present invention, an electronic signature process in each apparatus in this embodiment will be explained.

Electronic signature is the technology for verifying that information has been legitimately transmitted from a transmitting apparatus when a distant party, having received the information, acquires a public key of the transmitting apparatus from the verification institution server and is capable of reproducing the information using the same public key under the condition that a secret key is previously stored in the transmitting apparatus and the public key corresponding to such secret key is registered to the public verification institution server and that the information is transmitted to the distant party through encryption of the information using the secret key.

Figure 5:
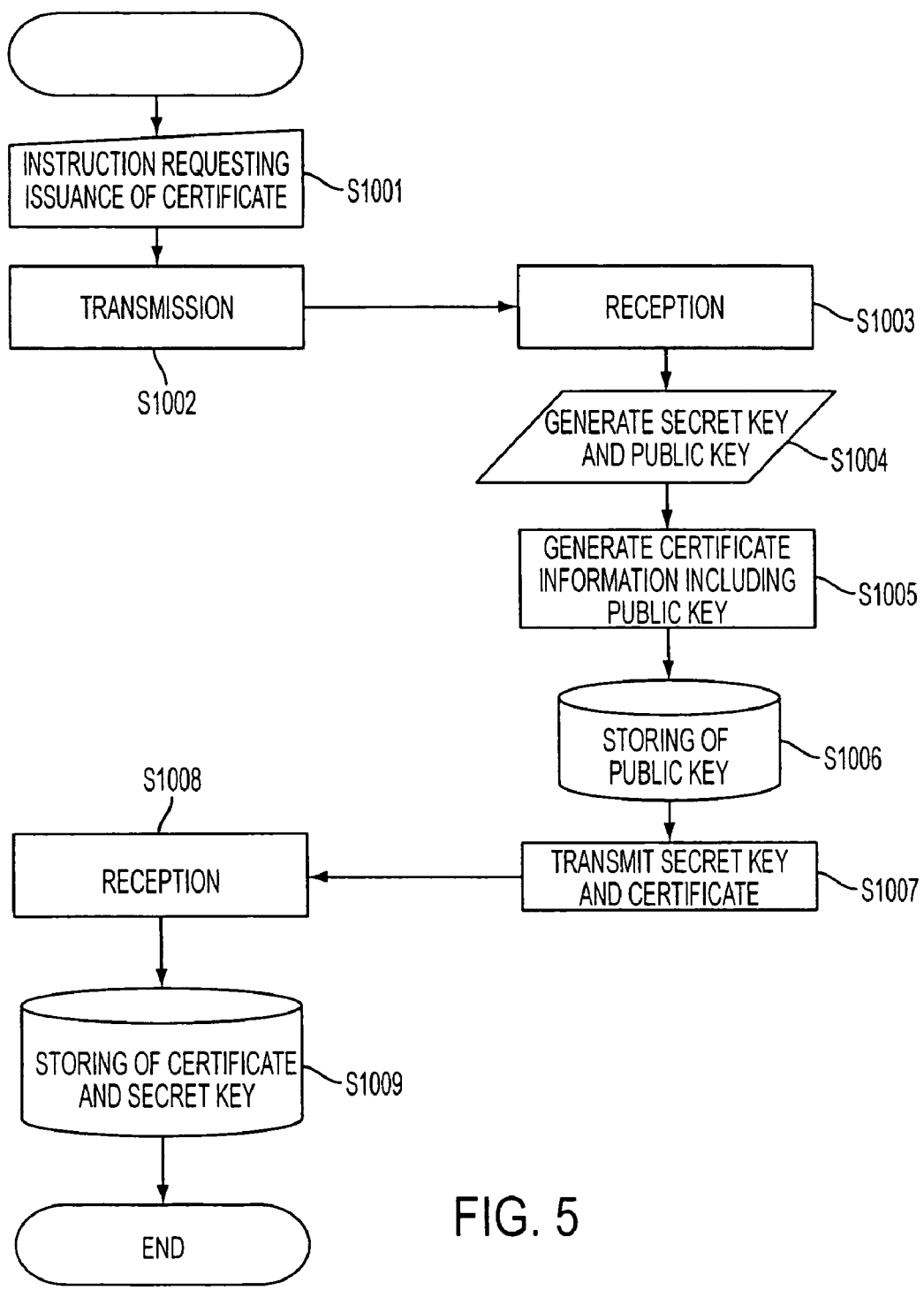
FIG. 5 is a flowchart illustrating the public key registration process between a verification instruction and a transmitting apparatus according to an embodiment of the present invention.

First, registration of a public key between a verification institution and a transmitting apparatus will be explained with reference to a flowchart in FIG. 5.

In the embodiment of FIG. 1, the purchase-desiring person terminal 2, virtual shop server 4, settlement institution server 6, and seller terminal 8 are all constituted as the transmitting apparatus of an electronic signature and electronic signatures are all added using identical procedures except for that a user of the purchase-desiring terminal 2 and seller terminal 8 directly execute the procedures, while users of the virtual shop server 4 and settlement institution server 6 execute the procedures via the virtual shop terminal 5 and settlement institution terminal 7. Therefore, in the explanation of such procedures, these apparatuses are called, in general, the transmitting apparatus.

First, when a user of the transmitting apparatus inputs the certificate issuing request information by manipulating a transmitting apparatus (S1001), the transmitting apparatus transmits the certificate issuing request information inputted to the settlement institution server 3 (S1002).

The certificate issuing unit 32 of the verification institution server 3, having received this information with the communicating means 33 (S1003), generates (S1004) a secret key and a public key corresponding to this secret key and the certificate information (S1005) including this public key generated, and stores the certificate information generated to the public key DB31.

Thereafter, the certificate issuing unit 32 controls the communicating means 33 and transmits (S1007) the secret key and certificate generated to the transmitting apparatus having transmitted the certificate issuing request information via the Internet.

The transmitting apparatus having received this information (S1008) stores (S1009) the secret key and certificate received to a storage device thereof (storage region in a signature unit 45 in the case of the intermediary server 4 (as shown in FIG. 3), storage region in a signature unit 63 in the case of the settlement institution server 6 (as shown in FIG. 4), and storage region not explained in the case of the purchase-desiring person terminal 2 and seller terminal 8) in order to complete the process thereof.

Figure 6:
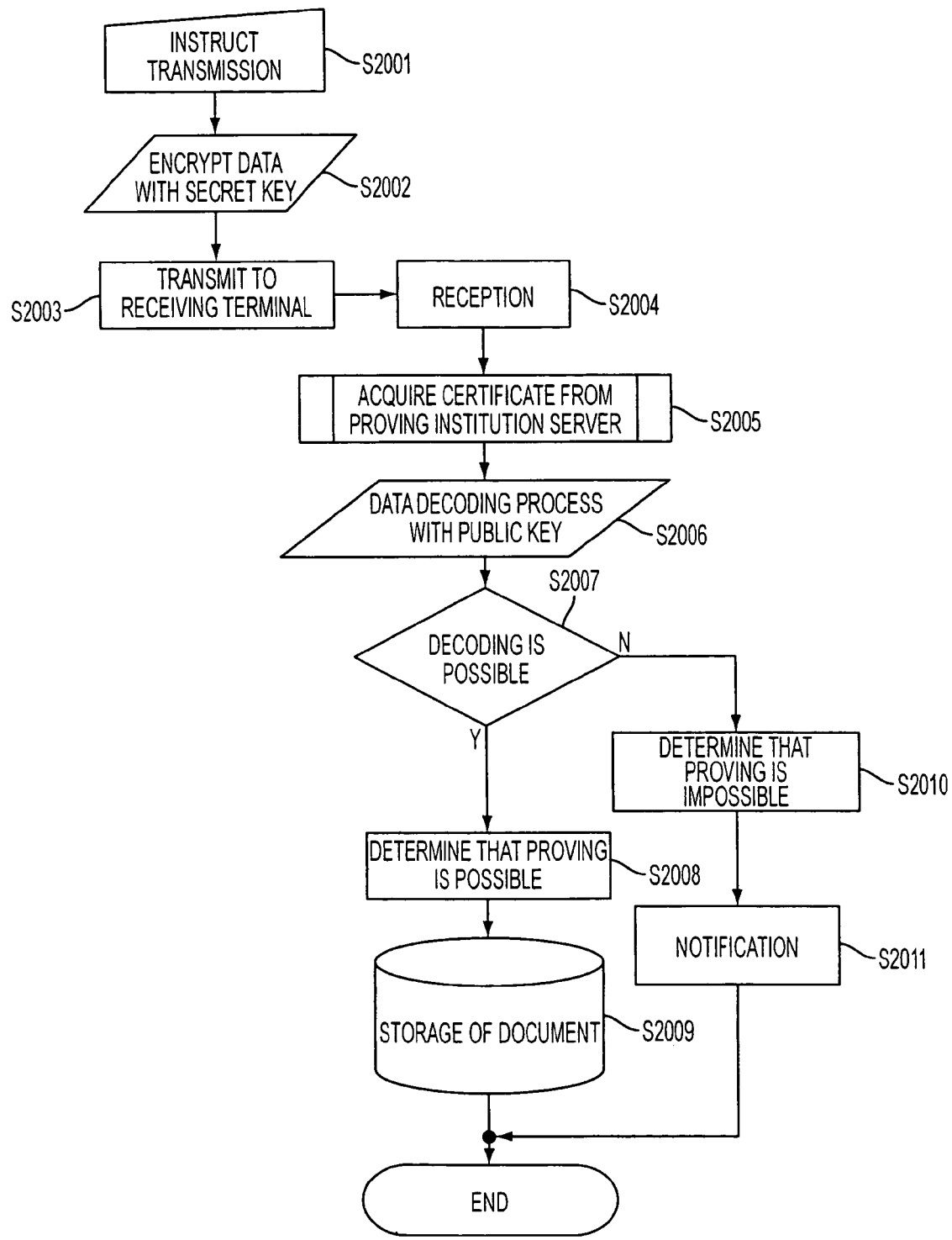
FIG. 6 is a flowchart illustrating the transmitting and receiving processes of the information adding an electronic signature and the verifying process of a receiving apparatus according to an embodiment of the present invention.

Next, the transmitting and receiving processes of the information, with addition of electronic signature, and the verifying process of the receiving apparatus, according to the embodiment, will be explained with reference to FIG. 6.

Since it is also possible to use the purchase-desiring person terminal 2, virtual shop server 4, settlement institution server 6 and seller terminal 8 as the receiving apparatus of electronic signature. The apparatus used for actual transmission is defined here as the transmitting apparatus for convenience of explanation, while the apparatus for receiving such information is defined as the receiving apparatus.

First, when a user of the transmitting apparatus adds an electronic signature to certain information and then inputs (S2001) an instruction to the transmitting apparatus to transmit the same information, the transmitting apparatus encrypts (S2002) the instructed information using the secret key stored in the storage region and then transmits the information to the receiving apparatus (S2003).

The receiving apparatus having received this information (S2004) acquires a certificate of a sender (S2005) from the verification institution server 3. Next, the receiving apparatus executes (S2006) a decoding process of the information received from the transmitting apparatus using the public key included in the certificate acquired. The receiving apparatus determines whether the information has been decoded or not with this decoding process (S2007). When the information has been decoded, the receiving information stores the information (S2009) on the basis of the information transmitted from the transmitting apparatus having been proved (S2008).

When the information cannot be decoded, on the contrary, the receiving apparatus determines (S2010) that the information cannot be proved as that transmitted from the transmitting apparatus, and executes the notification process to the user thereof, such as a display showing that the information cannot be proved (S2011).

Next, the settlement process by the system of this embodiment will be explained.

For the process of electronic signature, each apparatus is assumed to execute the procedures for electronic signature. Moreover, it is also assumed that the purchase-desiring person controls the purchase-desiring person terminal 2 to access the web site of the intermediary, namely the server 4, and has found a desirable product at a virtual shop as the intermediary server 4.

Figure 7:
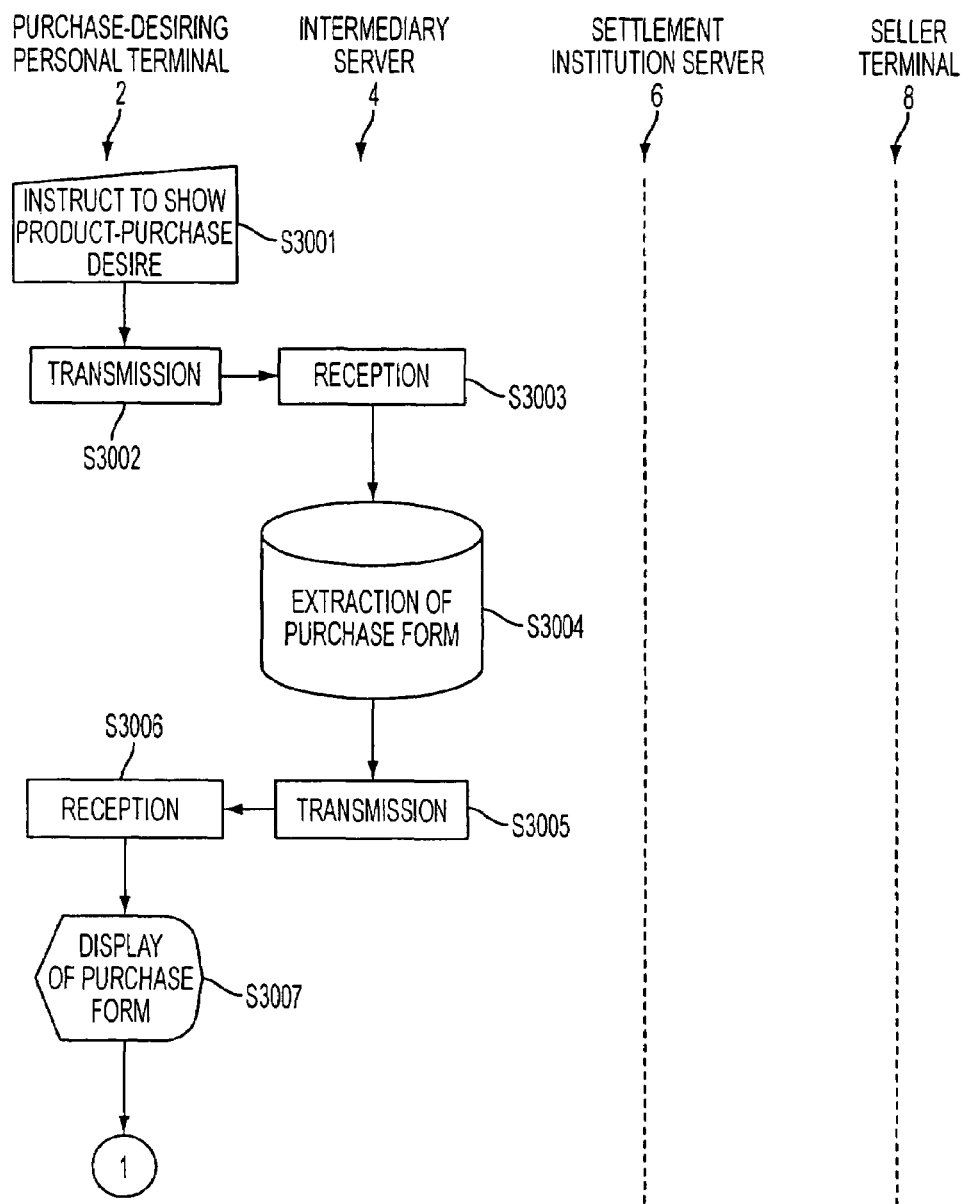
FIG. 7 is a flowchart illustrating the settlement process by the system according to an embodiment of the present invention.

First, when a purchase-desiring person issues an instruction to show desire of purchase of a product to the purchase-desiring person terminal 2 in the flowchart of FIG. 7 (S3001), the purchase-desiring person terminal 2 transmits (S3002) the purchase-desiring information to the intermediary server. The web site TB 45 of the intermediary server 4, having received (S3003) this information via the communicating means 47, accesses the web site DB 41, extracts (S3004) the purchase format information, and transmits the extracted information to the purchase-desiring person terminal 2 (S3005).

The purchase-desiring person terminal 2 having received (S3006) this information displays this purchase format (S3007).

Figure 8:
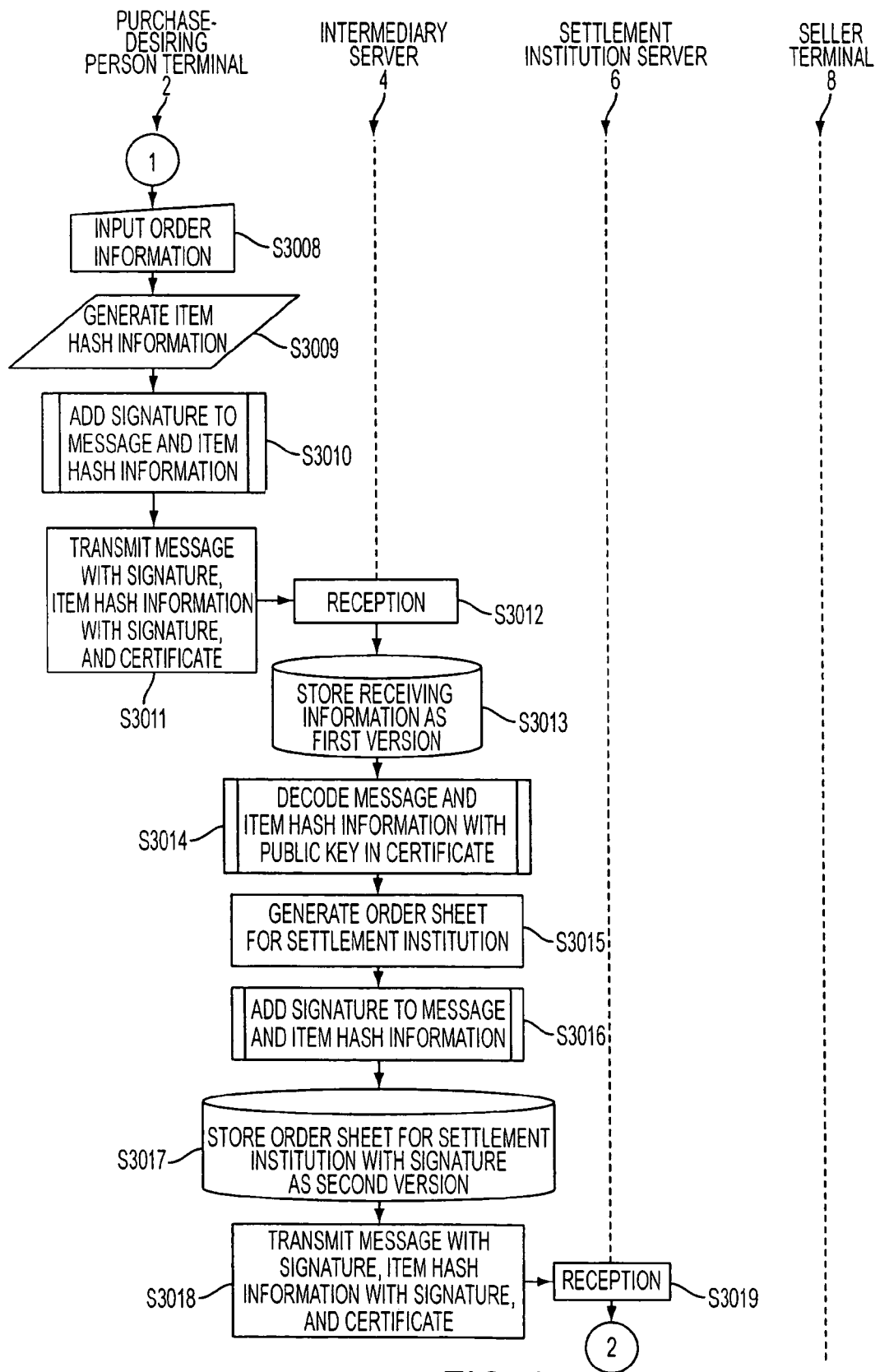
FIG. 8 is a flowchart illustrating the settlement process by the system according to an embodiment of the present invention.

When the purchase-desiring person watching this purchase format inputs the personal information to this purchase format (FIG. 8: S3008), the purchase-desiring person terminal 2 acquires a Hash value (S3009) using unidirectional Hash function or the like for each item of the personal information inputted. The purchase-desiring person terminal 2 also adds an electronic signature of the purchase-desiring person for all pieces of the personal information and also executes (S3010) the process to add an electronic signature for the Hash value of each item obtained in (S3009). (The electronic signature process is executed with the process explained previously.)

In this embodiment, it is assumed that "Name", "Address", "Product Name", "Amount of Money", and "Card Number" are inputted as the personal information of the purchase-desiring person with the procedures explained above as illustrated in FIGS. 9(*a*) and 9(*b*), the Hash values for respective items (item Hash information) are acquired, and the information adding an electronic signature of "Suzuki", the name of the purchaser, is generated for each piece of information.

The purchase-desiring person terminal 2 transmits the personal information adding the electronic signature and the Hash information to the intermediary server 4 as the order information (S3011).

The document TB of the intermediary server 4, having received (S3012) these information pieces via the communicating means 47, stores (S3013) the received information in the document management DB 42 as the first version of the order information to the received order information. Thereafter, the document management TB44 of the intermediary server 4 controls the verifying unit 46 to execute the verification process of the electronic signature added on the stored order information (S3014). As explained above, the electronic signature verification process is the process to actually conduct the decoding in view of verifying whether the information transmitted can be decoded or not using the public key of the sender, namely the purchase-desiring person. Therefore, when the personal information has been decoded with this process, it can be confirmed that the personal information has been transmitted from a legitimate person and the decoded personal information and the item Hash value information can also be acquired.

When the decoding is completed, the Hash value is acquired for each item of the decoded personal information of the first version and it is verified whether it is identical to the item Hash value of the first version or not. Thereby, it is possible to verify that the item Hash information and the personal information have been transmitted as a legitimate pair. (Here, if the decoding is impossible with this process or if the Hash value acquired of each item of the decoded first version of the personal information is different from the first version of the item Hash value information, the document management TB 44 sends an error message to the intermediary terminal 5 and suspends the process. Moreover, the intermediary terminal 5 executes a process to send the error message to the intermediary, such as display of an error.)

Thereafter, the document management TB 44 executes the process to generate the order information for the settlement institution on the basis of the decoded personal information (S3015).

Figure 10:
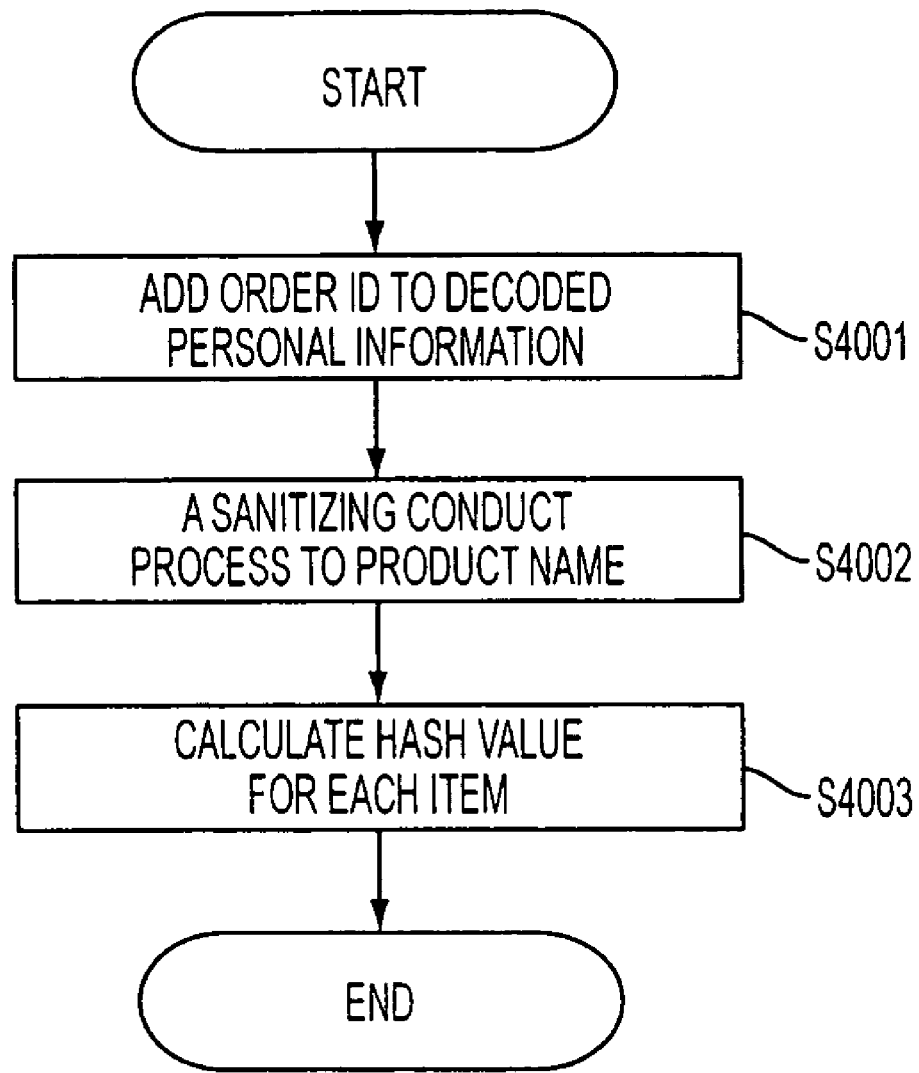
FIG. 10 is a flowchart illustrating an order sheet generating process for a settlement period with the intermediation server according to an embodiment of the present invention.

This process will be explained below with reference to the flowchart of FIG. 10.

First, the document management TB 44 adds an order ID as an item to the decoded personal information (S4001). This item should be a desired number different from the number of the other order sheets.

Next, the document management TB 44 executes (S4002) the Sanitizing process to the "Product Name" in the personal information amended in (S4001). However, in this process, only the Sanitizing is executed to make ambiguous the content of item "Product Name" and the process to delete the item itself is not executed. "Sanitizing" means the operation that blacks out the block of Information in the documents (e.g., for privacy, national secrets, etc.).

Next, the document management TB 44 calculates (S4003) the Hash value for each item of the personal information amended in (S4002).

Returning to the flowchart of FIG. 8, when this process is completed, the document management TB 44 executes (S3016) the process of adding a signature of each intermediary to the personal information amended with the processes in (S4001) and (S4002) and to the Hash value acquired in (S4003), and stores this information pair as a second version.

Figure 11A:
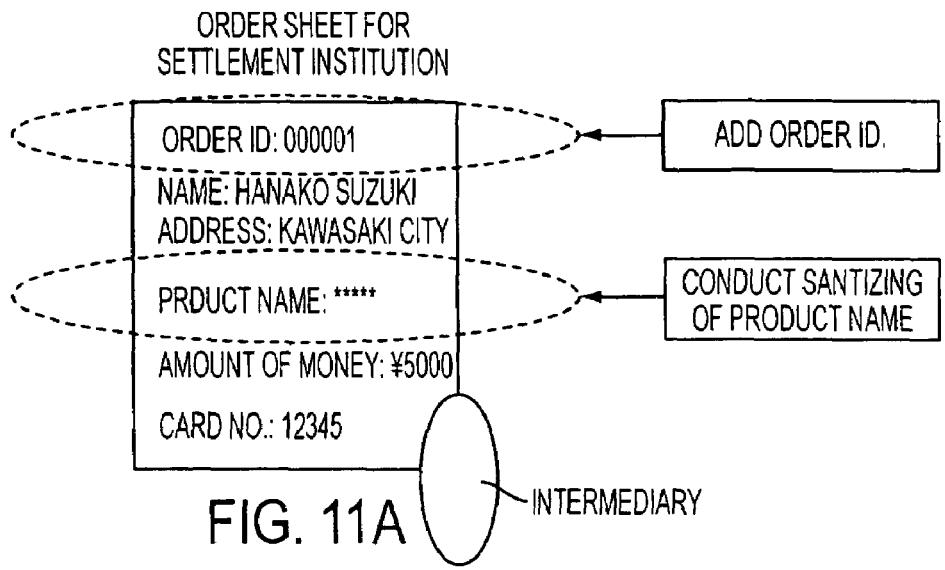
FIGS. 11(a) and 11(b) are diagrams illustrating a second version of the order sheet information generated with the intermediary server according to an embodiment of the present invention.
Figure 11B:
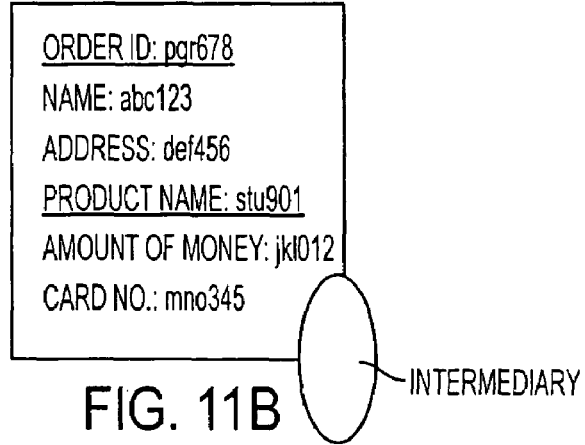

The order information of the second version generated after execution of these processes is illustrated in FIGS. 11(*a*) and (*b*).

Since the intermediary server 4 has executed the process as explained above, the personal information among the order information of the second version includes the order ID added to the order information of the first version sent from the purchase-desiring person terminal 2 in FIG. 9. Moreover, the product name is amended to "****" as the Sanitizing information from "Red Shoes". In addition, an electronic signature of the intermediary is added to this personal information.

Moreover, since the addition and amendment explained above are executed, the result acquired includes the Hash value of the order ID as illustrated in FIG. 11(*b*), and also includes the Hash value of the product name which is different from the Hash value of the first version. On the contrary, each item not amended has the Hash value identical to that of the first version because the Hash value of the first version is acquired. Moreover, the electronic signature of the intermediary is added as the electronic signature.

When these processes are completed, the document management TB44 of the intermediary server 4 transmits, as illustrated in FIGS. 12(*a*), 12(*b*) and 12(*c*), a set of three information pieces of the personal information of the second version, item Hash value of the first version, and item Hash information of the second version to the settlement institution server 6 (S3018).

Namely, the personal information and item Hash information which have been amended by the intermediary and given the electronic signature of the intermediary and the item Hash information given the electronic signature of the purchase-desiring person before amendment by the intermediary server 4 are transmitted as a set of information pieces to the settlement institution server 6.

Figure 13:
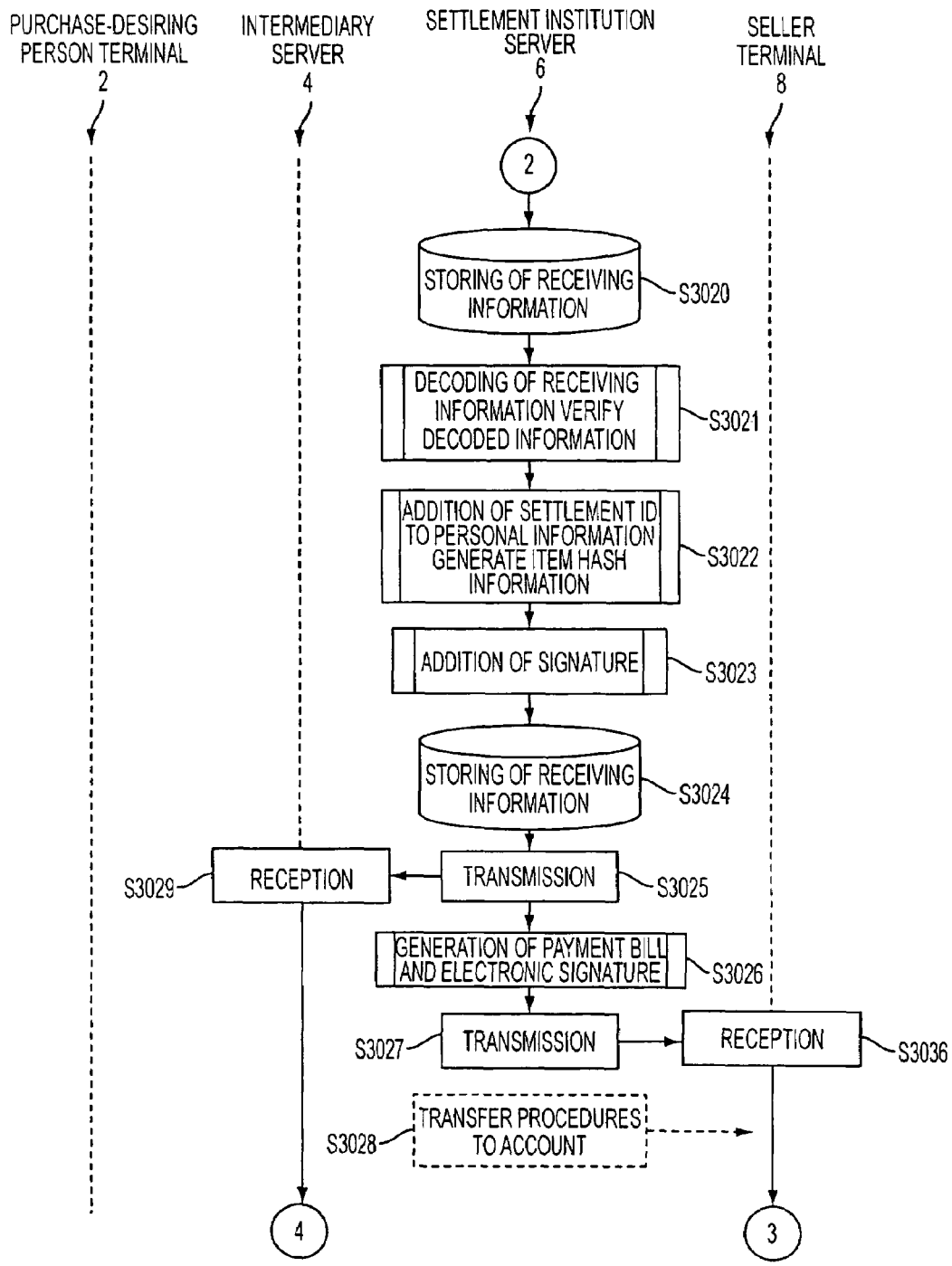
FIG. 13 is a flowchart illustrating the settlement process performed by the system according to an embodiment of the present invention.

The document management TB62 of the settlement institution server 6 having received (S3019) this information via the communicating means 65 stores the received information in the document management DB61 (FIG. 13: S3020).

The document management TB62 instructs the verifying unit 64 to verify the received information.

The verifying unit 64 acquires certificates of the purchase-desiring person and intermediary from the authentication institution server 3. This verifying unit 64 decodes, in accordance with procedures of the electronic signature authentication process, the item Hash information of the first version using the public key included in the certificate of the purchase-desiring person and executes comparison of the settlement sheet information of a second version, namely the personal information and item Hash information of the second version using the public key included in the certificate of the intermediary. In addition, during execution of this process, the Hash value of the personal information of the second version is acquired and it is verified whether it is identical to the item Hash information of the second version or not.

Moreover, the decoded item Hash information of the first version is compared with the item Hash information of the second version to verify that the Hash value of the order ID is added to the item Hash information of the first version, the Hash value of the product name is different between the item Hash information of the first version and the item Hash information of the second version, the Hash value of the other item is not different between the item Hash information of the first version and the item Hash information of the second version. Items other than those explained above are not added (S3021). The reasons to execute these verification processes will be further supplemented below.

As explained above, the intermediary server 4 transmits three information pieces (item Hash information of the first version, personal information of the second version, and item Hash information of the second version). Since the personal information of the second version and the item Hash information of the second version are given the electronic signatures of the intermediary, there exists a risk that a pair of such information pieces is intentionally changed with the intermediary server 4.

In order to verify an intentional change in the pair of information pieces explained above, it is verified whether the personal information of the second version and the item Hash information are legitimate or not by verifying whether each item of the personal information of the second version having acquired the Hash value is identical to each item of the item Hash information of the second version transmitted or not through the collation thereof, utilizing the fact that the Hash value is determined almost uniquely for a certain value.

Moreover, under the precondition that such verification has been executed, since it becomes possible for the settlement institution to prove the part amended by the intermediary and the part inputted by the purchase-desiring person, by comparing the item Hash information of the first version, namely the item Hash information to which the electronic signature of the purchase-desiring person is added, with the Hash value of each item of the second version, even when the personal information of the first version of the order sheet information, namely the personal information of the purchase-desiring person in the order sheet information, is not presented to the settlement institution, the settlement institution having the settlement institution server 6 is also capable of accepting the information as the legitimate order information from the purchase-desiring person.

The document management TB62 executes, when legitimacy is verified with the verifying information of the verifying unit 64 in the (S3021), the process to add the settlement ID to the personal information of the second version decoded next and generates the Hash value of each item of the personal information to which the settlement ID is added (S3022). (If legitimacy cannot be verified as a result of the verification process in (S3021) with the verifying unit 64, the document management TB62 transmits an error message to the settlement institution terminal 7 and this settlement institution terminal 7 executes a process to send the information to a person in charge of the settlement institution, such as displaying the information, and then interrupts the processes.)

The document management TB62 instructs the signature unit 64 to execute the process to add the electronic signature of the settlement institution to the personal information amended in (S3022) and the item Hash information generated (S3023).

Upon completion of the process in (S3023), the document management TB62 stores the personal information and item Hash information to which the electronic signature of the settlement institution is added in S3023 into the document management DB61 as the order sheet information of a third version (S3024).

The third version of the order sheet information after completion of the processes explained above is illustrated in FIGS. 14(*a*) and 14(*b*).

As is understood from FIGS. 14 (*a*) and 14(*b*), the settlement ID is added to the personal information and the Hash value corresponding to this settlement ID, and is also added to the item Hash information for the order sheet information of the second version illustrated in FIG. 11, namely the order sheet information transmitted from the intermediary. The other items are not altered in the personal information item Hash information from that in the order sheet information of the second version.

Moreover, an electronic signature of the settlement institution is added to this personal information item Hash information of the third version.

Upon completion of this storing, the document management TB62 controls the communicating means 65 to transmit the order sheet information of the third version stored in the document management DB61 to the intermediary server 4 (S3025).

Figure 15:
FIG. 15 is a diagram illustrating the payment bill information generated with the settlement institution server according to an embodiment of the present invention.

Next, the document management TB62 generates the payment bill information to the seller to which the settlement ID and amount of payment are added as illustrated in FIG. 15, moreover an electronic signature (S3026) is added to this payment information and then transmits this payment bill information to the seller terminal 8 (S3027).

Moreover, a person in charge of the settlement institution executes, upon completion of this settlement, the procedure to transfer the same amount of money to the account of the seller (S3028).

Figure 16:
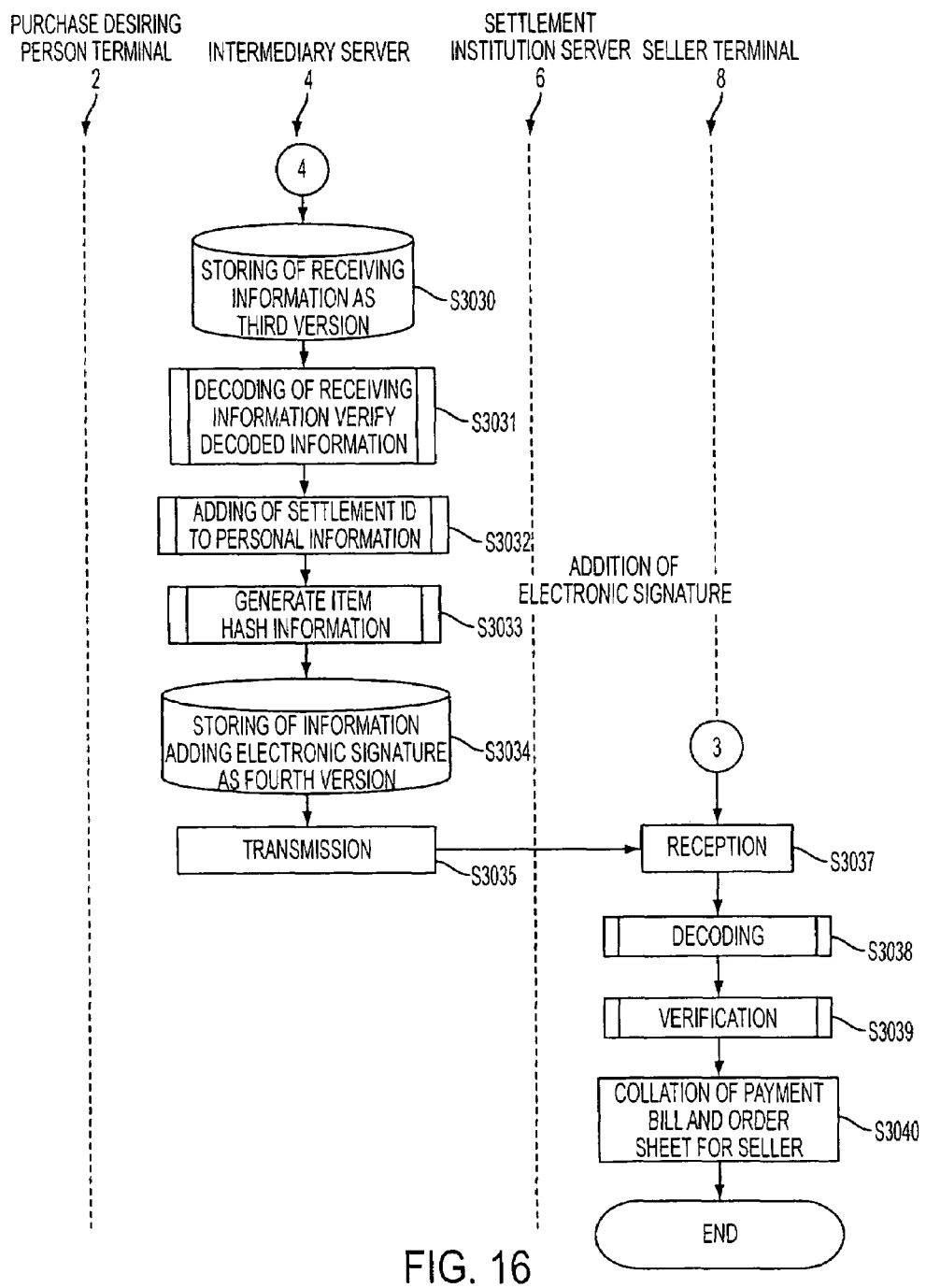
FIG. 16 is a flowchart illustrating the settlement process with the system according to an embodiment of the present invention.
Figure 18A:
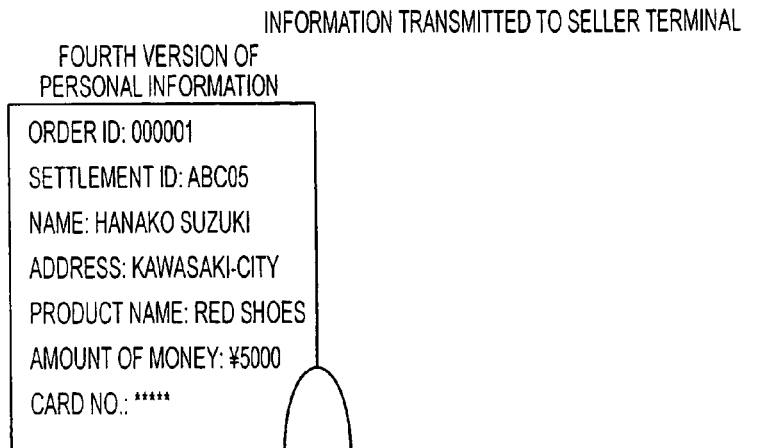
FIGS. 18(a), 18(b), 18(c), 18(d) and 18(e) are diagrams illustrating the information transmitted to a seller terminal from the intermediary server according to an embodiment of the present invention.
Figure 18B:
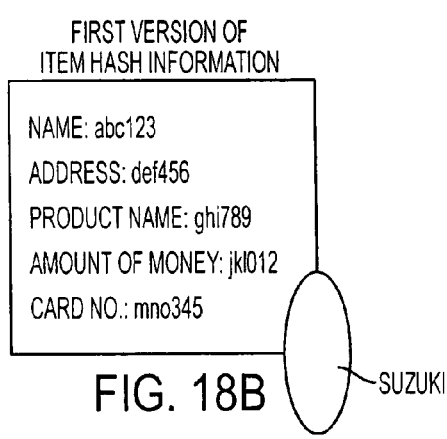
Figure 18D:
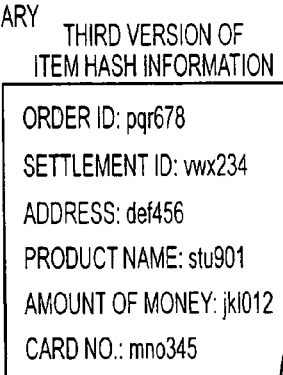
Figure 18C:
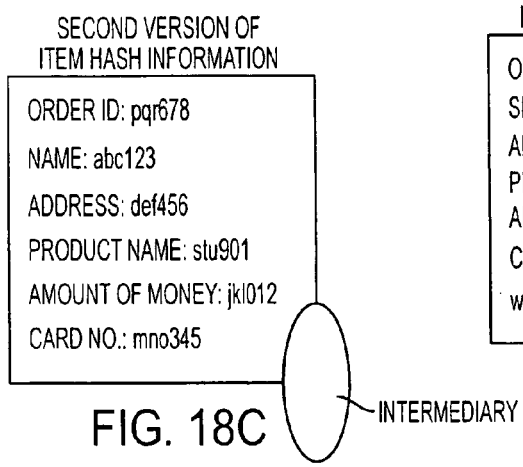
Figure 18E:
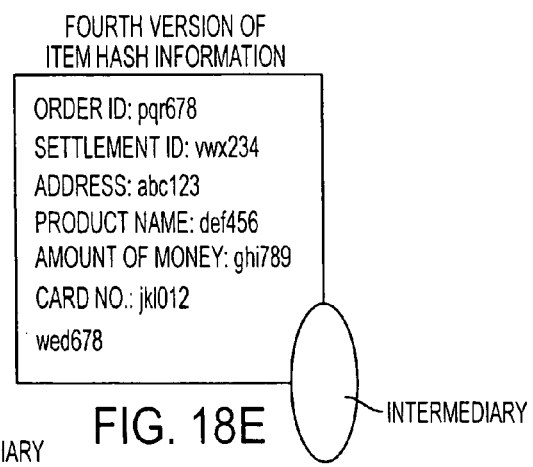

The document management TB44 of the intermediary server 4 receives, via the communicating means 47, the order sheet information of the third version transmitted from the settlement institution server 6 in (S3028) and stores this order information of the third version to the information management DB42 (FIG. 16: S3030).

Thereafter, the document management TB44 requests, to the verifying unit 46, the decoding process and verifying process of the personal information and item Hash information of the order information of the third version (S3031).

The verifying unit 46 acquires, responding to this request, a certificate of the settlement institution server 6 from the authentication institution server 3 in accordance with the procedure to verify the electronic signature explained above and decodes the personal information item Hash information to which the electronic signature is added with the settlement institution server 6, which is the order sheet information of the third version by utilizing the public key included in this certificate.

The verifying unit 46 acquires, thereafter, the order ID of the decoded personal information and the order sheet information of the third version including the same order ID from the document management DB42.

The verifying unit 46 acquires the Hash value for each item of the decoded personal information to compare it with the extracted item Hash information of the third version to verify whether these are identical or not.

With this process, it can be checked that the personal information included in the order sheet information of the third version and the item Hash information form a pair.

In addition, the second version of item Hash information being accumulated is compared with the item Hash information of the third version to verify whether the Hash of each item other than the settlement ID is altered or not. Thereby, it is proved in the process of the settlement institution server 6 that the Hash of each item other than the settlement ID is not revised with the intermediary server 4.

When legitimacy is verified with this process, the document management TB44 generates order sheet information (S3032). (When legitimacy cannot be checked as a result of the verifying process in (S3031) with the verifying unit 46, the document management TB46 transmits an error message to the intermediary terminal 5 and, thereby, the intermediary terminal 5 interrupts the process by informing the process to a person in charge of the intermediary, using, for example, a display of this information.)

In other words, in the process in (S3032), the document management TB44 extracts the personal information of the order sheet information of the first version from the document management DB42, decodes this personal information, and replaces the item information of product name in the third version of the personal information with the product name of the first version of the personal information. Moreover, the same document management TB44 executes the Sanitizing process to the card number of the personal information of the third version and also acquires the Hash value of each item of the revised personal information.

Next, the document management TB44 controls the signature unit 45 to execute the process to add an electronic signature to the personal information amended in (S3032) and the generated item Hash information (S3033).

Thereafter, the document management TB44 forms a fourth version of the order sheet information with a pair of the personal information and item Hash information to which the electronic signatures are added with the process in (S3033) and then stores this fourth version of the order sheet information to the document management DB42 (S3034).

Next, the document management DB44 extracts, as illustrated in FIGS. 18(*a*), 18(*b*), 18(*c*), 18(*d*) and 18(*e*), the fourth version of the order sheet information and the item Hash information with electronic signature of the first to the third versions from the document management DB42 and then transmits these information pieces at a time to the seller terminal 8 (S3035).

The seller terminal 8 acquires, upon reception of the payment bill information transmitted from the settlement institution server 6 with the process in (3027) (FIG. 13: S3036) and the information transmitted (S3037) from the intermediary with the process in (S3035), the certificate information of the purchase-desiring person, intermediary and settlement institution from the authentication institution server 3 and decodes the transmitted information with electronic signatures using the public key included in each certificate (S3038).

Next, the seller terminal 8 executes the following verifying process on the basis of each piece of decoded information (S3039).

For this process, the seller terminal 8 is assumed to store a correspondence table of each item and a creator (terminal and server) illustrated in FIG. 19 within a storing means (not illustrated).

This correspondence table indicates the creators (terminal and server) when the legitimate creators have created or revised each item.

Figure 20:
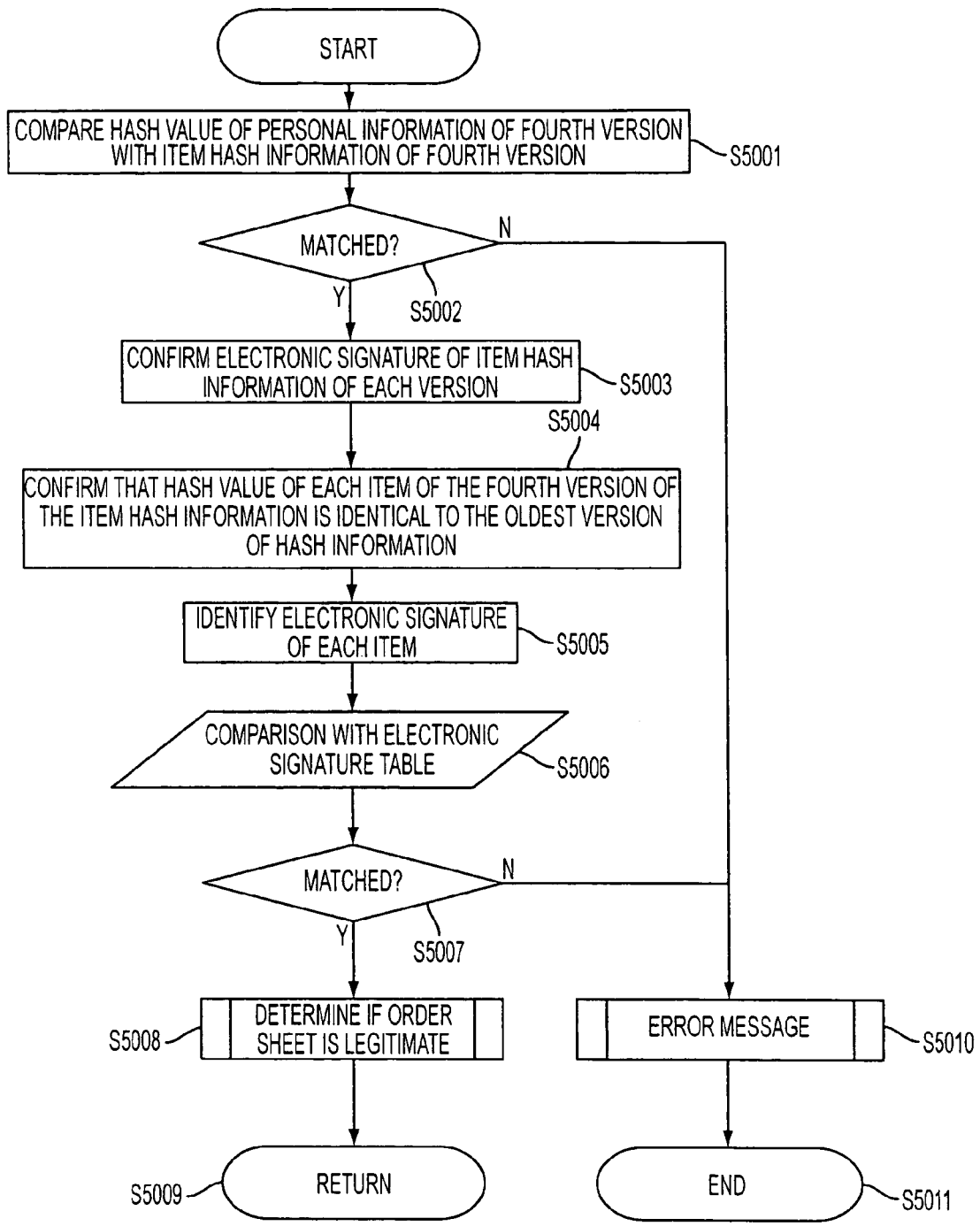
FIG. 20 is a flowchart illustrating a verifying process with the seller terminal according to an embodiment of the present invention.

This process will be explained on the basis of the flowchart in FIG. 20.

First, the seller terminal 8 acquires the Hash value for each item of the decoded personal information of the fourth version and compares it with the decoded item Hash information of the fourth version to verify whether these are identical (S5002).

When these are determined as identical in (S5003), electronic signature information added to the item Hash information of each version is verified and is then stored in a storing means (not illustrated) of the seller terminal 8. The stored information is illustrated in FIG. 21. In this embodiment, since the item Hash information illustrated in FIG. 18 is transmitted, it is stored, as illustrated in FIG. 21, so that an electronic signature of Suzuki who is an owner of the purchase-desiring person terminal 3 is added to the first version, an electronic signature of an "Intermediary" to the second and fourth versions, and an electronic signature of a "settlement institution" to the third version.

Next, the decoded item Hash information of the first to third versions is compared with the item Hash information of the fourth version. It is then checked whether the Hash value of each item is identical to the oldest version of item Hash information. The result of this check is stored in the storing means (not illustrated) of the seller terminal 8 (S5004).

With the process in (S5004), since the item Hash information as illustrated in FIGS. 18(*a*)-18(*e*) is transmitted in this embodiment like the process in (S5003), when process (S5004) is executed, the corresponding version is the second version for the "order ID", the third version for "settlement ID", the first version for "name", "address", "product name", and "amount of money", and the fourth version for card number, as illustrated in FIG. 22. This information is therefore stored in the storing means (not illustrated) of the seller terminal 8.

Next, the seller terminal 8 generates a correspondence table of the electronic signatures corresponding to each item from the correspondence information (refer to FIG. 21) of the number of versions to electronic signatures and the correspondence information (FIG. 22) of the item to number of versions stored in the storing means (not illustrated) of the seller terminal 8. Namely, since the number of versions information is stored in the correspondence information (refer to FIG. 22) of the item to number of versions, the electronic signature corresponding to this information is determined with reference to the correspondence information (refer to FIG. 21) of the number of versions to electronic signatures. Moreover, the result of this process is stored in the seller terminal 8 (S5005). The item to electronic signature correspondence information generated with this process is illustrated in FIG. 23.

Next, the seller terminal 8 compares the item to electronic signature correspondence information (refer to FIG. 23) stored in the storing means (not illustrated) of the seller terminal 8 with the correspondence table (refer to FIG. 19) of each item to creator (terminal and server) previously stored in the storing means (not illustrated) of the seller terminal 8 (S5006).

Here, since these matched each other (S5007), it is determined that the legitimate document has been inputted (S5008) and the process is continued (S5009).

Moreover, when it is determined that these are "different" with the determination process in (S5002) and (S5007), an error message is sent (S5010) and the process is completed (S5011).

Returning to the flowchart of FIG. 16, the seller terminal 8 extracts, after the process in (S5009), the payment bill information, from the storing means (not illustrated) of the seller terminal 8, including the same settlement ID as that included in the personal information of the fourth version which has been proved to be legit in (S3039), compares the amount of money in the amount of money item of the extracted payment bill with the amount of money entered in the amount of money item included in the personal information of the fourth version, and determines that correct payment has been made when these amounts of money are identical and sends a message indicating the correct payment, or incorrect payment if these amounts of money are different (S3040).

As explained above, according to the present embodiment, it has become possible to prove who (or which terminal and server) has created or amended which items of the personal information.

Therefore, if the Sanitizing has been conducted to the personal information with the intermediary server in the course of the processes, it is possible to identify the area not amended with the purchase-desiring person terminal 2 in the amended personal information. Accordingly, the order sheet information amended with the intermediary server can be accepted as the official order sheet information upon reliance on this information by identifying the information used by a user of the purchase-desiring person terminal 2 with the settlement institution server 6.

This is also true in the seller terminal 8 for receiving the order sheet information after amendment of both intermediary server 4 and the settlement institution server 7.

Moreover, verification is conducted, in order to prove legitimacy, by utilizing the item Hash information, having recorded the Hash value of each item of the personal information.

Since a part inputted to the purchase-desiring person terminal 2, namely the part not revised from the beginning, can be identified with this information while the intrinsic personal information is hidden, the items which are not inherently required to be sent to the relevant company or institution among the personal information can be sent to the relevant company or institution, while these are hidden.

In addition, according to this embodiment, the corresponding order sheet information is identified and collation between the payment bill information and order sheet information is conducted with the seller terminal by utilizing the order ID added in the intermediary server 4 and the ID added in the settlement institution server 6. Since it is also possible to prove with which server these items are added, such items can also be employed as the reliable ID. As a result, collation and identifying processes can be realized without use of a number, which may be used illegally (e.g., a credit card number), among the personal information.

Further, the present application is not limited to the above-described embodiments, and variations changes and modifications would be obvious to one of ordinary skill in the art. These changes and modifications may be made without departing from the scope of the present invention, and it is intended that the present application encompass such changes and modifications.

What is claimed is:

1. A computer-readable storage medium storing a personal information verification program controlling a computer, which can communicate with a settlement institution server and can access storing means for storing settlement information, to execute:

storing received information in said storing means;

transmitting said received information to the settlement institution server when a first version of personal information, including information showing a desired purchase and identifying information identifying a settlement institution, identifying a purchase-desiring person, and a first version of verification information verifying a creator of each item of said first version of the personal information, are received;

generating a third version of personal information by erasing the identifying information of the settlement institution, and a third version of verification information verifying a creator of each item of said third version of the personal information, and transmitting, to a seller apparatus of a product seller, the third version of the personal information, the third version of the verification information and the first version of the verification information, along with a second version of the verification information stored in said storing means, when a second version of the personal information, including a settlement number and said first version of the personal information, and the second version of the verification information verifying a creator of each item of the second version of the personal information, are received from said settlement institution server;

generating the second version of the personal information, by hiding a product item name of said first version of the personal information and adding an electronic signature, and the second version of the verification information, transmitting the second version of the personal information and the second version of the verification information to the settlement institution server, and storing said second version of the personal information and said second version of the verification information in said storing means, when the first version of the personal information is received; and generating a fourth version of the personal information, by erasing the identifying information of the settlement institution, and a fourth version of the verification information identifying a creator of each item of said fourth version of the personal information, and transmitting said fourth version of the personal information and said fourth version of the verification information to a seller apparatus of a product seller together with the first version of the verification information, the second version of the verification information, and the third version of the verification information stored in said storing means, when the third version of the personal information, including the settlement number and said second version of the personal information, and the third version of the verification information, are received from said settlement institution server.

2. The computer-readable storage medium according to claim 1, said program further controlling the computer to execute:

transmitting said received information to said settlement institution server when the first version of the personal information and a first version of item hash information are received, adding an electronic signature to a hash value of each item of said first version of the personal information; and generating a third version of the item hash information, adding an electronic signature to a hash value of each item of said third version of the personal information, and transmitting, to a seller apparatus of product seller, the generated third version of the personal information, the third version of the item hash information and the first version of the item hash information, along with a second version of the item hash information stored in said storing means when the second version of the personal information, including the settlement number and said first version of the personal information, and the second version of the item hash information, and an electronic signature added to a hash value of each item of the second version of the personal information, are received from said settlement information server.

3. The computer-readable storage medium according to claim 1, said program further controlling the computer to execute:

generating the second version of the item hash information, adding an electronic signature to the hash value of each item of said second version of the personal information, and transmitting the second version of the personal information and the second version of the item hash information to the settlement institution server and storing said second version of the personal information and said second version of the item hash information in said storing means, when the first version of the personal information and the first version of the item hash information are received; and generating the fourth version of the item hash information, adding an electronic signature to the hash value of each item of said fourth version of the personal information, and transmitting, to a seller apparatus of a product seller, said generated fourth version of the personal information, the fourth version of the item hash information, the first version of the item hash information and the second version of the item hash information and the third version of the item hash information, when the third version of the personal information, including the settlement number and said second version of the personal information, and the third version of the item hash information, and an electronic signature added to the hash value of each item of said third version of the personal information, are received from said settlement institution server.

4. A personal information verification method for controlling a computer, which can communicate with a settlement institution server and can access storing means for storing settlement information, comprising:

storing received information in said storing means;

transmitting said received information to the settlement institution server when a first version of personal information, including information showing a desired purchase and identifying information of the settlement institution identifying a purchase-desiring person, and a first version of verification information verifying a creator of each item of said first version of the personal information, are received;

generating a third version of the personal information, by erasing the identifying information of the settlement institution, generating a third version of the verification information verifying a creator of each item of said third version of the personal information, and transmitting, to a seller apparatus of a product seller, said generated third version of the personal information, the third version of the verification information and the first version of the verification information, along with a second version of the verification information stored in said storing means when a second version of the personal information, including a settlement number and said first version of the personal information, and the second version of the verification information verifying a creator of each item of said second version of the personal information are received from said settlement institution server;

generating the second version of the personal information, by hiding a product item name of the first version of the personal information and adding an electronic signature to said first version of the personal information, generating the second version of the verification information verifying a creator of each item of said second version of the personal information, and transmitting the second version of the personal information and the second version of the verification information, adding an electronic signature to the settlement institution server and storing said information in said storing means when the first version of the personal information and the first version of the verification information verifying a creator of each item of said personal information of the first version are received; and generating a fourth version of the personal information, by erasing the identifying information of the settlement institution, generating a fourth version of the verification information identifying a creator of each item of said fourth version of the personal information, and transmitting said fourth version of the personal information and said fourth version of the verification information to a seller apparatus of a product seller together with the first version of the verification information, the second version of the verification information and the third version of the verification information, stored in said storing means, when the third version of the personal information, including the settlement number and said second version of the personal information, and the third version of the verification information verifying a creator of each item of said third version of the personal information are received from said settlement institution server.

5. A personal information verification apparatus, comprising:

storing means for storing settlement information;

settlement institution server transmitting means for storing received information in said storing means and transmitting said received information in a settlement institution server when a first version of personal information, including information showing a purchase desire and identifying information of a settlement institution identifying a purchase-desiring person, and a first version of verification information, verifying a creator of each item of said first version of the personal information, are received;

seller transmitting means for generating a third version of the personal information, by erasing the identifying information of the settlement institution, generating a third version of the verification information verifying a creator of each item of said third version of the personal information, and transmitting said generated third version of the personal information, the third version of the verification information and the first version of the verification information, along with a second version of the verification information, stored to said storing means, when the second version of the personal information, including a settlement number and said first version of the personal information, and the second version of the verification information, verifying a creator of each item of said second version of the personal information, are received from said settlement institution server;

said settlement institution server transmitting means for further generating the second version of the personal information, by hiding a product item name of the first version of the personal information and adding an electronic signature to said first version of the information, generating the second version of the verification information verifying a creator of each item of said second version of the personal information, and transmitting, to a settlement institution server, the second version of the personal information and the second version of the verification information and storing said second version of the personal information and the second version of the verification information to said storing means, when the first version of the personal information is received, and said seller transmitting means for further generating a fourth version of the personal information by erasing the identifying information, generating a fourth version of the providing information identifying a creator of each item of said fourth version of the personal information, and transmitting, to a seller apparatus of a product seller, said fourth version of the personal information and said fourth version of the providing information together with the first version of the verification information, the second version of the verification information, and the third version of the verification information stored in said storing means, when the third version of the personal information including the settlement number and said second version of the personal information and the third version of the verification information verifying a creator of each item of the third version of the personal information, are received from said settlement institution server after the transmitting said second version of the personal information.

6. A personal information verification system using an intermediary server to execute an intermediation process for selling a product by a seller, and a settlement institution server to execute payment to the seller as a settlement, wherein said intermediary server comprises:
storing means for storing settlement information;
settlement institution server transmitting means for transmitting said received information to said settlement institution server, when a first version of personal information, including information showing a purchase desire and identifying information of a settlement institution identifying a purchase-desiring person, and a first version of verification information, verifying a creator of each item of said first version of the personal information, are received; and
a seller transmitting means for generating a third version of the personal information, by erasing the identifying information, generating a third version of the verification information, verifying a creator of each item of said third version of the personal information, and transmitting, to a seller apparatus of a product seller, said third version of the personal information and said third version of the verification information, along with the first version of the verification information and a second version of the verification information stored in said storing means, when said second version of the personal information, including a settlement number and said first version of the personal information, and the second version of the verification information, verifying a creator of each item of said second version of the personal information, are received from said settlement institution server; and said settlement institution server comprises:
second version personal information generating means for generating, upon reception of information from an intermediary, the second version of the personal information, and for adding an electronic signature to said received information;
second version verification information generating means for generating the second version of the verification information;
intermediary server transmitting means for transmitting, to said intermediary server, the second version of the personal information, which is generated and given the electronic signature, and the second version of the verification information;
payment means for generating a payment bill, adding the settlement number to said second version of the personal information and transmitting said payment bill to the seller;
the second version personal information generating means generating the second version of the personal information, by hiding a product item name of said first version of the personal information and adding an electronic signature, and the second version of the verification information, transmitting the second version of the personal information and the second version of the verification information to the settlement institution server, and storing said second version of the personal information and said second version of the verification information in said storing means, when the first version of the personal information is received;
fourth version personal information generating means generating a fourth version of the personal information, by erasing the identifying information of the settlement institution; and
fourth version verification information generating means generating a fourth version of the verification information identifying a creator of each item of said fourth version of the personal information, and transmitting said fourth version of the personal information and said fourth version of the verification information to a seller apparatus of a product seller together with the first version of the verification information, the second version of the verification information, and the third version of the verification information stored in said storing means, when the third version of the personal information, including the settlement number and said second version of the personal information, and the third version of the verification information, are received from said settlement institution server.

7. A method for verifying personal information using a computer communicating with a settlement institution server, comprising:
transmitting a first version of personal information and a first version of verification information to the settlement institution server;
transmitting to a seller apparatus a second version of the verification information, when a second version of the personal information and the second version of the verification information are received from said settlement institution server;
generating a third version of the personal information and a third version of the verification information, and transmitting the third versions of the personal information and verification information, along with the first version of the verification information, to the seller apparatus;

generating the second version of the personal information, by hiding a product item name of said first version of the personal information and adding an electronic signature, and the second version of the verification information, transmitting the second version of the personal information and the second version of the verification information to the settlement institution server, and storing said second version of the personal information and said second version of the verification information in a storage, when the first version of the personal information is received; and generating a fourth version of the personal information, by erasing the identifying information of the settlement institution, and a fourth version of the verification information identifying a creator of each item of said fourth version of the personal information, and transmitting said fourth version of the personal information and said fourth version of the verification information to the seller apparatus of a product seller together with the first version of the verification information, the second version of the verification information, and the third version of the verification information stored in said storing means, when the third version of the personal information, including a settlement number and said second version of the personal information, and the third version of the verification information, are received from said settlement institution server.

8. The method according to claim 7, the first version of the personal information comprising information showing a desired purchase and information identifying a purchase-desiring person.

9. The method according to claim 7, the first version of the verification information comprising information verifying a creator of each item of the first version of the personal information.

10. The method according to claim 7, the second version of the verification information comprising information verifying a creator of each item of the second version of the personal information.

11. The method according to claim 7, the second version of the personal information adding a settlement number to the first version of the personal information.

12. The method according to claim 8, the third version of the personal information erasing information identifying a purchase-desiring person.

13. The method according to claim 7, the third version of the verification information verifying each item of the third version of the personal information.

* * * * *